(12) United States Patent
Levine et al.

(10) Patent No.: US 7,035,385 B2
(45) Date of Patent: Apr. 25, 2006

(54) METHOD AND SYSTEM FOR SCREENING CALLS DURING VOICEMAIL MESSAGING

(75) Inventors: David A. Levine, Atlanta, GA (US);
Greg N. Patterson, Atlanta, GA (US);
James Worsham, Buford, GA (US);
Zhigiang Zeeman Zhang, Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/108,892

(22) Filed: Mar. 29, 2002

(65) Prior Publication Data
US 2004/0258220 A1    Dec. 23, 2004

(51) Int. Cl.
*H04M 1/64* (2006.01)
(52) U.S. Cl. .................................... 379/88.23; 455/413
(58) Field of Classification Search ............. 379/88.01, 379/67, 88.25, 82, 88.22, 88.23, 88.26, 142.07, 379/88.24, 88.12, 88.17, 211.01, 373.02, 379/88.18; 455/406, 414.1; 370/401; 709/202
See application file for complete search history.

(56) References Cited

U.S. PATENT DOCUMENTS

| | | | | |
|---|---|---|---|---|
| 5,471,519 A | * | 11/1995 | Howe et al. | 379/88.26 |
| 5,651,054 A | * | 7/1997 | Dunn et al. | 379/88.23 |
| 6,031,896 A | * | 2/2000 | Gardell et al. | 379/88.25 |
| 6,266,524 B1 | * | 7/2001 | Dee et al. | 455/406 |
| 6,310,939 B1 | * | 10/2001 | Varney | 379/88.01 |
| 6,337,898 B1 | * | 1/2002 | Gordon | 379/82 |
| 6,477,246 B1 | * | 11/2002 | Dolan et al. | 379/211.02 |
| 6,529,587 B1 | * | 3/2003 | Cannon et al. | 379/88.22 |
| 6,574,319 B1 | * | 6/2003 | Latter et al. | 379/142.07 |

\* cited by examiner

*Primary Examiner*—Ovidio Escalante
*Assistant Examiner*—Gerald Gauthier
(74) *Attorney, Agent, or Firm*—Walters & Zimmerman; Jennifer Medin; Todd Mitchem (57) ABSTRACT

The present invention relates to systems and methods for monitoring and intercepting messages to a voicemail system connected to an AIN or WIN network for screening calls incoming to a landline or wireless telephone. After a call is forwarded to voicemail system, the called party is provided an opportunity to monitor a message as it is spoken into a voicemail system. The called party may intercept the message at any time during delivery of the message to answer the telephone call.

17 Claims, 5 Drawing Sheets

METHOD AND SYSTEM FOR SCREENING CALLS DURING VOICEMAIL MESSAGING

BACKGROUND OF THE INVENTION

1. Field of the Invention

The present invention relates to voicemail messaging systems operating over the Advanced Intelligent Network ("AIN") or the Wireless Intelligent Network ("WIN"). More particularly, the present invention relates to a system and method for redirecting telephone calls to and from voicemail messaging systems through the AIN or WIN.

2. Background Information

Many consumers prefer to screen incoming telephone calls to avoid answering either unwanted calls or unnecessary calls when a consumer is otherwise occupied. For example, a consumer may wish to learn what product or service is being offered by a telemarketing company before choosing to answer a call, or otherwise to simply avoid telemarketing sales calls altogether. As another example, a consumer may wish to avoid calls from a particular person at certain times. For safety concerns, it is also sometimes preferable to screen calls in order to avoid speaking with unknown callers.

Presently, there are several systems available that enable consumers to screen calls. In most landline telephone service areas and wireless telephone plans, consumers can subscribe to a "caller ID" service that allows consumers to identify the caller's name or telephone number before choosing whether or not to answer the call. The caller's name or telephone number is displayed on a screen on or near the consumer's telephone while the telephone is ringing. Consumers often can use this display to assist in deciding whether to avoid a caller without first having to answer the telephone.

Although caller ID systems often can be used effectively for screening calls, there are some situations in which caller ID displays do not enable a consumer to identify the actual caller. First, many callers know how to use caller ID blocking codes before dialing a consumer's telephone number to avoid being identified on a caller ID system. Second, caller ID systems may be inoperable when a call is dialed over a long-distance telephone line outside a local calling area. Finally, although caller ID systems can provide either the telephone number or the registered name for the calling party's telephone line, the actual calling party may be calling from another person's telephone. For example, if a friend calls from a pay phone, the consumer may not recognize the telephone number for the pay phone that is provided on the caller ID system, and may conclude incorrectly that the call is from a stranger.

Another disadvantage of caller ID systems is that such systems do not enable subscribers to screen messages from the caller to allow the subscriber to determine whether she is interested in accepting the call. If an incoming call is from a stranger, a subscriber may wish to know why the stranger is calling before deciding whether to pick up the telephone (e.g., the subscriber may wish to accept a call from someone who found the subscriber's lost credit card, but may not want to accept a call from a company offering a new credit card account). Even if the subscriber recognizes the calling party's telephone number, she may still wish to know the nature of the call to decide whether to pick up the telephone (e.g., whether a neighbor is calling because of an emergency or just to socialize). Unfortunately, because caller ID systems do not record messages, the subscriber may have to call back each person who called, thereby defeating the purpose of screening the calls.

Telephone network-operated voicemail is another system for screening telephone calls that are received at telephones in a landline or wireless network. In such network-based voicemail systems, unanswered calls to subscribers' telephones are forwarded to a central voicemail system or database. Once connected to the voicemail system, the caller may hear a greeting or other announcement, and can leave a message for the subscriber. The caller's message may be digitally recorded and stored in the voicemail database or may be recorded using some other suitable medium. After at least one message has been recorded by the voicemail system, the telephone network alerts the subscriber that she has one or messages waiting. The alert may be provided as an audible signal (e.g., a short, "stutter" signal may be provided on the subscriber's telephone extension before "regular" dial tone is provided, or the subscriber's customer premises equipment (CPE) may ring or provide other audible alerts). Alternatively, the alert may be a visual cue (e.g., the CPE may include a visual voicemail waiting indication such as a light flashing) to notify the subscriber that a message is waiting. The subscriber can then call a special telephone number and retrieve the message from a personalized "voicemail box" in the database after providing a password to the voicemail system.

As described above, in conventional network-based voicemail services all calls from a subscriber's telephone that remain unanswered after a certain number of rings are forwarded to the voicemail server. Once the call has been forwarded to the voicemail system, the subscriber is unable to listen to the caller as she leaves a message until after the caller's recording is completed (e.g., typically after the calling party "hangs up"). Therefore, a conventional network-based voicemail system does not enable a subscriber to screen calls in "real time." To screen calls, a caller must wait for an indeterminable amount of time after the telephone rings, check for an alert from the network indicating a new voicemail message has been received, call the voicemail system to retrieve the message, and then return the call to the caller if desired. If a subscriber receives many telephone calls, this would be an inefficient and tiresome process.

A conventional analog cassette or digital answering machine is yet another system for screening telephone calls. Answering machines are connected to a telephone extension in the home and can be programmed to answer a call after a certain number of rings, play a greeting or announcement, and then record a message. With an answering machine, users can play back messages that were received when the called party was away from the home or otherwise unable or unwilling to answer the telephone call. In most cases, if a user wishes to screen calls, she can listen to a message as it is being received and recorded on the answering machine. At any time during the recording of the message, the user can pick up the telephone to answer the call and disconnect the answering machine.

Although conventional answering machines allow users to effectively screen calls, many users prefer using a network-based voicemail system instead of using a traditional answering machine. While both answering machines and voicemail systems may allow subscribers to retrieve messages by calling a designated number from any telephone, many subscribers prefer the centralized backup and redundancy provided by a network-based system. Moreover, if there are several persons who share a telephone line, each can maintain a separate, private voicemail box in the voicemail system, to enable callers to place messages in a particular voicemail box corresponding to the intended recipient. Another advantage of network-based voicemail systems is that the telephone network can forward calls to the voicemail system when the telephone line is occupied (e.g., when a computer is connected to the telephone to connect to the Internet). In this manner, a subscriber can continue to receive messages at all times. Finally, unlike answering machines, a telephone network-based voicemail system may be used in conjunction with wireless telephones in the wireless network.

In view of the foregoing, it can be appreciated that a need exists for a method and system for screening calls incoming to either landline to wireless telephones that enables a subscriber to screen messages in real-time, while still enjoying other commonly-available features associated with conventional telephone network-based voicemail systems.

SUMMARY OF THE INVENTION

The present invention relates to systems and methods for monitoring and intercepting messages to a voicemail system based in an AIN or WIN network for screening calls to a landline or wireless telephone subscriber. After a call is forwarded to a voicemail system, the subscriber (i.e., the "called party") is provided an opportunity to monitor a message as it is being recorded by the voicemail system. The called party may intercept the message at any time during delivery of the message to be connected to the caller.

It is an object of the present invention to provide a method for enabling a voicemail subscriber to screen telephone calls in real-time. An incoming call intended for a subscriber's telephone is forwarded to a service node if the call is unanswered or cannot be connected to the subscriber because the subscriber's line is busy. The service node places an outgoing call from the service node to the subscriber's voicemail box and an outgoing call from the service node to the subscriber's telephone. The incoming call and the outgoing calls are connected to a conference bridge, such that the subscriber can listen to a voicemail message as it is being recorded in the subscriber's voicemail box. If a key sequence is provided over the subscriber's telephone to indicate that the subscriber desires to intercept the call, the service node enables the subscriber and the caller to engage in a two-way conversation. The call is then released from the voicemail box.

DETAILED DESCRIPTION OF THE INVENTION

An embodiment of the present invention enables a voicemail subscriber, for either a landline or wireless telephone, to screen voicemail messages in real-time and selectively accept calls that already have been forwarded to the voicemail system. In this embodiment, when an incoming call remains unanswered after a certain number of rings, it is forwarded to a service node (SN) instead of directly to the voicemail system. The service node then initiates a first call to the voicemail system and initiates a second call to the subscriber's telephone directory number (DN). Preferably, the call to the subscriber's DN uses "distinctive ringing" to alert the subscriber that the call is from a voicemail screening service according to the present invention. Alternatively, if the subscriber has caller ID, the calling name and calling number for the service node may be set to inform the subscriber that the call is from the voicemail monitoring service.

If the second call is answered (i.e., the subscriber's telephone is answered), a three-port conference bridge is allocated on the service node for joining the caller, the voicemail system and the subscriber in a conference call. Preferably, the voice path between the subscriber and the caller is muted such that the caller cannot determine whether or not the subscriber is screening the call. At any time while the caller is leaving a voicemail message, the subscriber can press a predetermined number sequence to enable (i.e., unmute) the voice path and initiate a two-way conversation between the subscriber and the caller.

Figure 1:
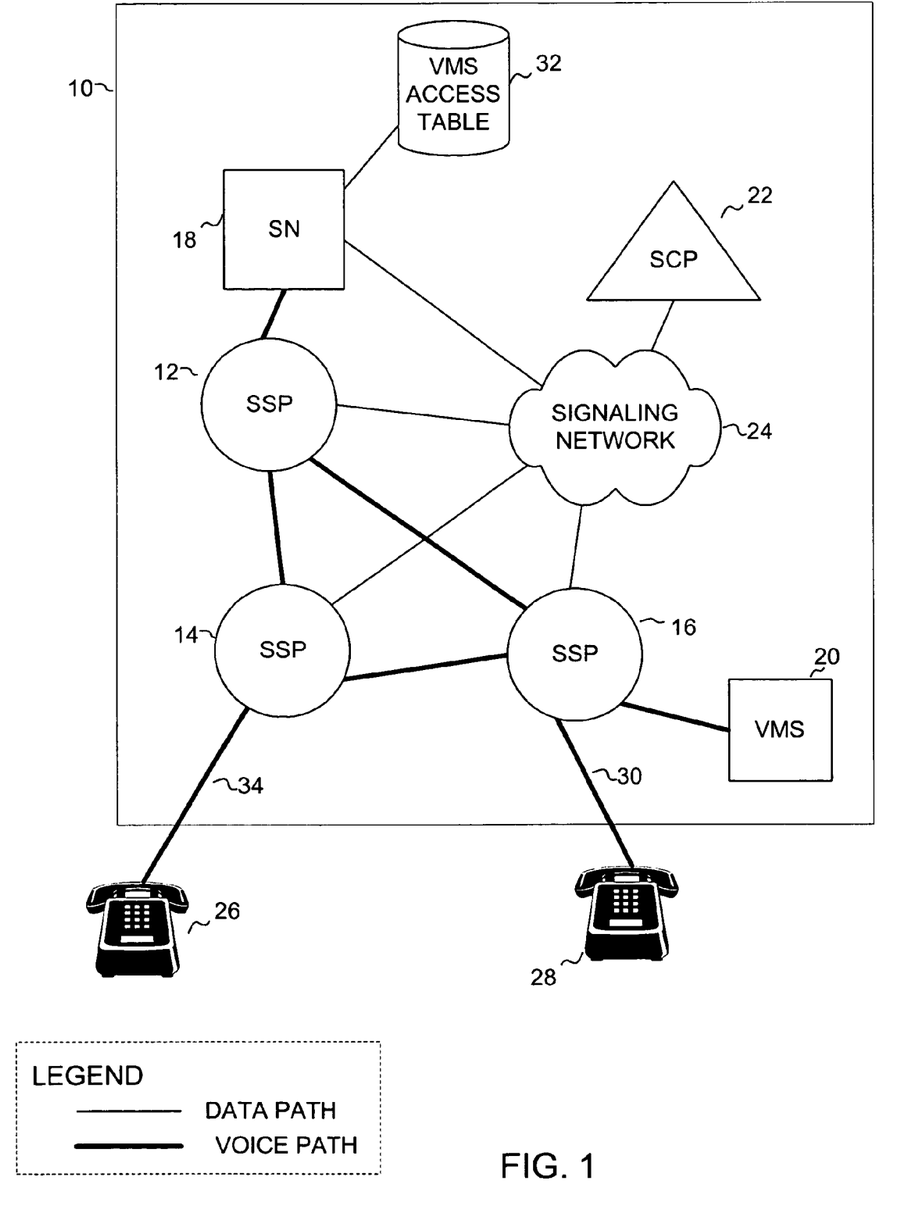
FIG. 1 is a schematic diagram of the architecture for a voicemail service according to an embodiment of the present invention, in which calls to a landline telephone are redirected to voicemail.

FIG. 1 is a schematic diagram of the architecture for a voicemail service according to an embodiment of the present invention directed to screening of calls placed to a landline telephone after they have been forwarded to a voicemail system. Telephone network 10 includes a plurality of service switching points (SSP) (e.g., SSP 12, 14 and 16) that are interconnected by voice paths for carrying voice and other communications between calling and called parties. Telephone network 10 also includes one or more service nodes (SN) (e.g., SN 18) and one or more voicemail systems (VMS) (e.g., VMS 20) providing a variety of voice-related calling services for subscribers and callers. Telephone network 10 further includes one or more service control points (SCP) (e.g., SCP 22) used to support advanced intelligent network (AIN) services. Signaling network 24 supports call setup and other signaling data messages transmitted between the various nodes of telephone network 10. Signaling network 24 may be the well-known signaling system number seven (SS7) or may be some other suitable data network supporting out of band signaling in a telephone network.

As is known in the art, a service node is a special-purpose computer including a plurality of telephony ports and internal switching capabilities. As such, a service node is connected to an SSP in the same manner as a residential/business subscriber. Also, as known in the art, a service node includes data links to signaling network 24, as shown in FIG. 1.

In the embodiment shown in FIG. 1, a calling party using telephone 26 places a call to telephone 28 by dialing the directory number for landline 30. Note, that although the caller in this example uses a landline telephone, serviced by SSP 14, the caller may in fact be calling from a wireless telephone serviced by a mobile switching center (MSC) (not shown in FIG. 1). The call is routed from the caller's SSP 14 to the subscriber's SSP 16 according to conventional call routing technology. If the call is answered at telephone 28, then the call completes normally and no additional action is required. If landline 30 is unavailable, or after a predetermined number of rings, the call is routed to SN 18. This may be accomplished in any suitable manner, including for example, through a "call forwarding don't answer" (CFDA) feature available on many SSP systems. As known in the art, a CFDA feature may be used to route calls to an alternative number if an incoming call is not answered. In this embodiment of the present invention, the CFDA feature for the subscriber's line forwards the call to a telephone number associated with SN 18 instead of forwarding the call to VMS 20.

In an alternative embodiment, SCP 22 may be used to route the unanswered call to SN 18. This embodiment may be suitable, for example, when the subscriber's SSP 16 does not include a CFDA feature, or to implement a centralized management system for a very large network having multiple service nodes for processing voicemail screening services. In this embodiment, when the call is received by SSP 16, an AIN trigger is encountered on the subscriber's wireline 30 at SSP 16. The trigger may be any suitable AIN trigger causing the SSP to suspend call processing, including, for example, a termination attempt trigger (TAT). In response to the trigger SSP 16 sends a query message via signaling network 24 to SCP 22. The query typically includes the calling party information (e.g., the calling party's directory number, a billing number, and the like) and the called party information (e.g., the subscriber's directory number, and the like).

SCP 24 uses the called party number and checks its databases to determine whether the called party is a subscriber to the voicemail service. If the called party is a voicemail subscriber, the SCP responds to the query by sending to SSP 16 an "analyze_route conversation_with_no_answer" message, which instructs SSP 16 to complete the call to subscriber line 30 and to arm an "originating no answer" condition on the next event list. As known in the art, in response to such an instruction, SSP 16 terminates (i.e., connects) the call to line 30. If the call results in a no_answer condition, SSP 16 sends another query message to SCP 24 to inform the SCP of that result. In response to second query message, SCP 24 identifies a suitable service node on the network that may process a voicemail call screening service according to the present invention. SCP 24 issues an "analyze route" instruction having the called party number field set to a directory number assigned to the service node (e.g., SN 18). In response to the analyze_route instruction SSP 16 forwards the call to SN 18. In this manner, SCP 24 may direct the caller call to any available service node.

Once SN 18 receives the call from SSP 16 (whether it has been routed using a CFDA feature or using an SCP) it identifies the call as a voicemail call screening service based on the called party number. That is, because the SN receives the call on a designated line, the SN knows that the call should be bridged between a voicemail system and the subscriber. SN 18 accomplishes this task by looking up the subscriber's DN in voicemail system (VMS) access table 32 to identify the subscriber's VMS access number. SN 18 may obtain the subscriber's number by examining the original called party field in the call setup message (i.e., the initial address message (IAM)). If the subscriber's DN is found in the table 32, SN 32 uses the corresponding VMS access number to place a call to the subscriber's voicemail system 20.

Because the call from SN 18 to VMS 20 is a new call, SN 18 preferably sets certain parameters in the call setup message, so that, from the voicemail platform's perspective, the call appears as if it were forwarded from the subscriber landline 30. For example, SN 18 may set the Redirecting Number field or the Original Called Number field of the call setup message to include the DN for line 30. In this manner, when VMS 20 receives the call from SN 18, VMS 20 connects the call to the appropriate voicemail box associated with the subscriber. Also, to enable VMS 20 to properly identify the caller's number (i.e., the DN associated with telephone line 34), SN 18 sets the Calling Party Number field to the caller's number. In this manner, VMS 20 will properly store the caller's number to identify the calling party at the introduction of the stored message, as opposed to storing the SN's number.

Once the call is connected to the voicemail service, the caller 10 will hear the called party's recorded outgoing message and a tone, after which the caller can leave a message in the normal course. Unless and until the calling party 11 intercepts the voicemail, as will be described below, the caller 10 will be unaware that the voicemail service operates any differently from a conventional voicemail system.

As the call is being placed to VMS 20, a second outgoing call is placed from SN 18 to the subscriber's telephone line 30. Preferably, this call is made to a dependent RingMaster™ number that is affiliated with telephone line 30 to generate a "distinctive ringing" on telephone 28. As known in the art, RingMaster™, or equivalent services, enable a landline telephone to receive calls in response to several different telephone numbers, where each telephone number generates a distinctive "ringing" pattern. In this manner, a particular distinctive ringing pattern can be used to alert the subscriber party that the incoming call is from the voicemail screening service.

Alternatively, if distinctive ringing is not available, SN 18 may include a special number in the Calling Party Number field for the call to the subscriber's line. In this manner, the subscriber may use a caller ID system to identify the call as a call from the voicemail screening service. A descriptive name may be associated with the special number so that subscribers having caller ID with calling name may receive a message such as "VMS Screening" on their caller ID display box.

In cases where distinctive ringing is used to identify the call, SN 18 may include the caller's number (i.e., the DN for line 34) in the Calling Party Number field of the call setup message for the call to the subscriber. In this manner, if the subscriber has a conventional caller ID service, she will be able to identify that this particular voicemail screening call is related to a call from the caller at line 34. This additional feature may be particularly useful if the subscriber did not notice the caller ID display during the initial call.

SN 18 allocates a 3-port conference bridge for conferencing together the three calls. That is, the caller's call, which was forwarded to SN 18, will be bridged with the call from SN 18 to subscriber line 30 and the call from SN 18 to VMS 20. Once the call to VMS 20 has been answered, SN 18 answers the forward call (i.e., the call from line 34) and connects the two calls to the conferencing bridge. If the subscriber answers the voicemail screening call, that call is also bridged to the conference call. Preferably, the voice path from the subscriber's line 30 into the bridge is initially muted to prevent the caller from receiving notice that the call is being screened. If the subscriber's line remains unanswered, either because the subscriber is not available or does not wish to screen the telephone call, SN 18 drops out of the call path and releases all allocated resources. This may be accomplished, for example, by SN 18 instructing SSP 12 to maintain a call path between caller line 34 and VMS 20.

As described above, if the subscriber's line 30 is answered, SN 18 will connect the call to subscriber's line 30 to the conference bridge. This may be accomplished, e.g., using a "connect_oneway_path" in the conference bridge to prevent allow the subscriber to hear the conversation between VMS 20 and the caller, without the caller being able to hear the subscriber. Although the subscriber's voice path through the bridge is muted in this manner, the voice path from the subscriber SN 18 is still able to transport signaling and voice traffic. This allows the subscriber to send instructions to the service node if the subscriber wishes to actively join in the call (i.e., to "pickup" the caller's call and end the VMS connection).

While the connections of the three parties are established, the subscriber is able to screen (i.e. listen to) the message as it being left by the caller. In the meantime, SN 18 monitors the leg of the call to subscriber line 30 to determine whether or not the subscriber wishes to speak to the caller. In an embodiment of the present invention, the subscriber may enter a predetermined key sequence on her touch tone keypad. Alternatively, the subscriber may speak a predetermined word or phrase into her telephone handset to instruct the SN to allow the subscriber to speak to the caller. In this latter case, a voice recognition application on SN 18 interprets the subscriber's instruction.

In response to the subscriber's instruction (received either via the keypad or via a voice command), SN 18 may unmute the voice path through the conference bridge thereby allowing the subscriber and the caller to communicate. Preferably, SN 18 issues a command (e.g., an appropriate DTMF sequence) instructing VMS 20 to stop the recording process and to delete the partially recorded message. In this manner, VMS 20 will "clean up" the subscriber's voicemail box. Moreover, SN 20 preferably disconnects VMS 20 from the conference bridge and transfers control of the call back to SSP 12 thereby releasing the conference bridge resources which would no longer be needed.

Figure 2:
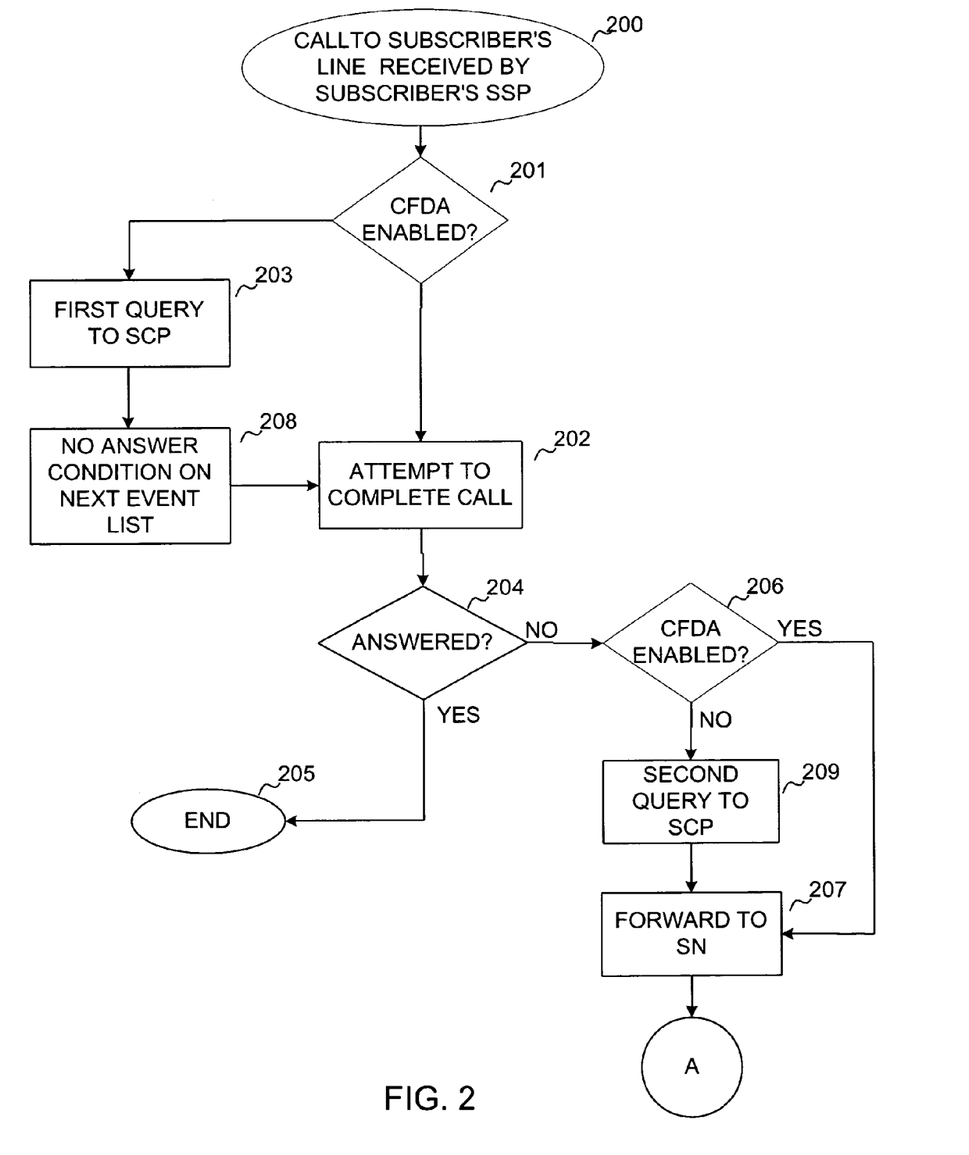
FIG. 2 is a flow diagram according to an embodiment of the present invention, illustrating steps performed to direct an incoming call from a subscriber's line to a service node.

The call flow for screening calls during voicemail messaging according to an embodiment of the present invention is now described with reference to FIGS. 2–4. FIG. 2 illustrates the steps performed from the perspective of the subscriber's SSP and the SCP (if needed) to direct the incoming call from the subscriber's line to the service node. In step 200, the call to the subscriber's line is received by the subscriber's SSP. If, in step 201, call forwarding don't answer (CFDA) is enabled, the SSP attempts to complete the call to the subscriber in step 202. Otherwise, if CFDA is not enabled, a trigger on the subscriber's line at the SSP is encountered and causes the SSP to send a first query to the SCP in step 203. If, in step 204 the call is answered, then the call is completed and processing is by the voicemail screening service ends in step 205. If the call is not answered after a predetermined amount of time, the process moves on the step 206. In step 206, if CFDA is enabled, the SSP forwards the call to the SN in step 207.

As described above, in step 201, if CFDA is not enabled on the subscriber's line on the SSP, a first query is sent to an SCP in step 203. In response to the query, the SCP instructs the SSP to set a no_answer condition on the next event list in step 208. Then, in step 202, the SSP attempts to complete the call to the subscriber's line. As described above, if the call is not answered and if CFDA is not enabled, the no_answer condition causes the SSP to send a second query to the SCP in step 209. Based upon information forwarded in the second query, the SCP instructs the SSP to forward the call to the service node, in step 207.

Figure 3:
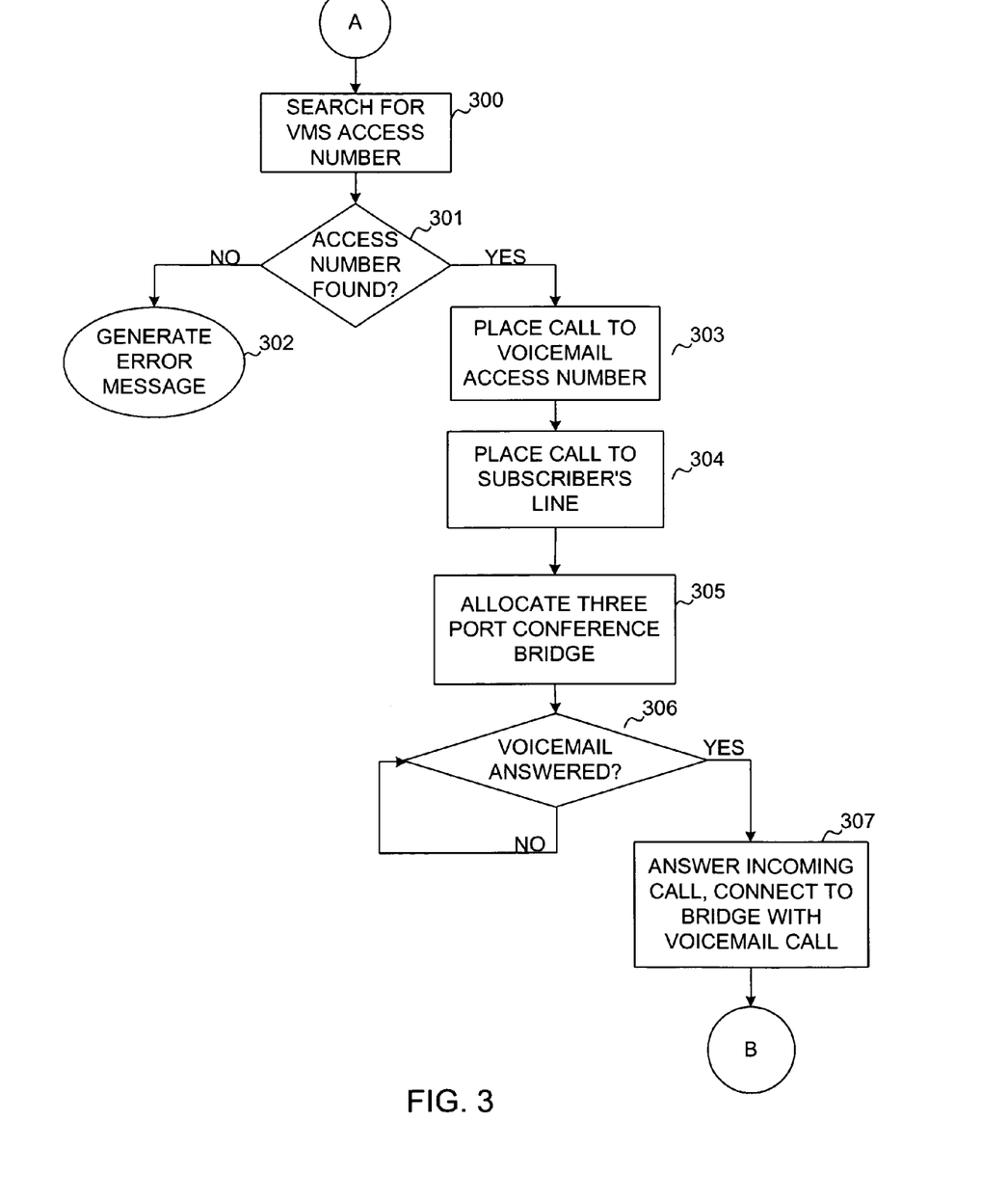
FIG. 3 is a flow diagram according to an embodiment of the present invention, illustrating steps performed by a service node to connect an incoming call, which was forwarded to the service node, to voicemail.

FIG. 3 illustrates steps performed by the service node (SN) to connect the incoming call, which was forwarded to the SN, to the VMS server. In step 300, the SN searches for a VMS access number in a database in communication with the SN. If, in step 301, the access number is not found, an error message is generated and the call is disconnected, in step 302. An announcement message may optionally be played to the caller before the call is disconnected. Otherwise, in step 303 the SN places an outgoing call to the VMS. Simultaneously, or nearly simultaneously, a second outgoing call is placed to the subscriber's line in step 304. It is also possible that the call to the subscriber's line is placed after a brief delay, to allow time for the VMS server to play an announcement message to the caller before the subscriber begins screening the voicemail message. Also, the SN may be programmed play an appropriate message to the subscriber if the subscriber answers her call before the VMS platform answers its call.

The SN allocates a three port conference bridge in step 305. Once the outgoing call to the voicemail system is answered, in step 306, the SN answers the incoming call (i.e., the caller's call that had been forwarded from the subscriber's SSP) and connects the incoming call to the bridge with the outgoing call to the voicemail server, in step 307.

Figure 4:
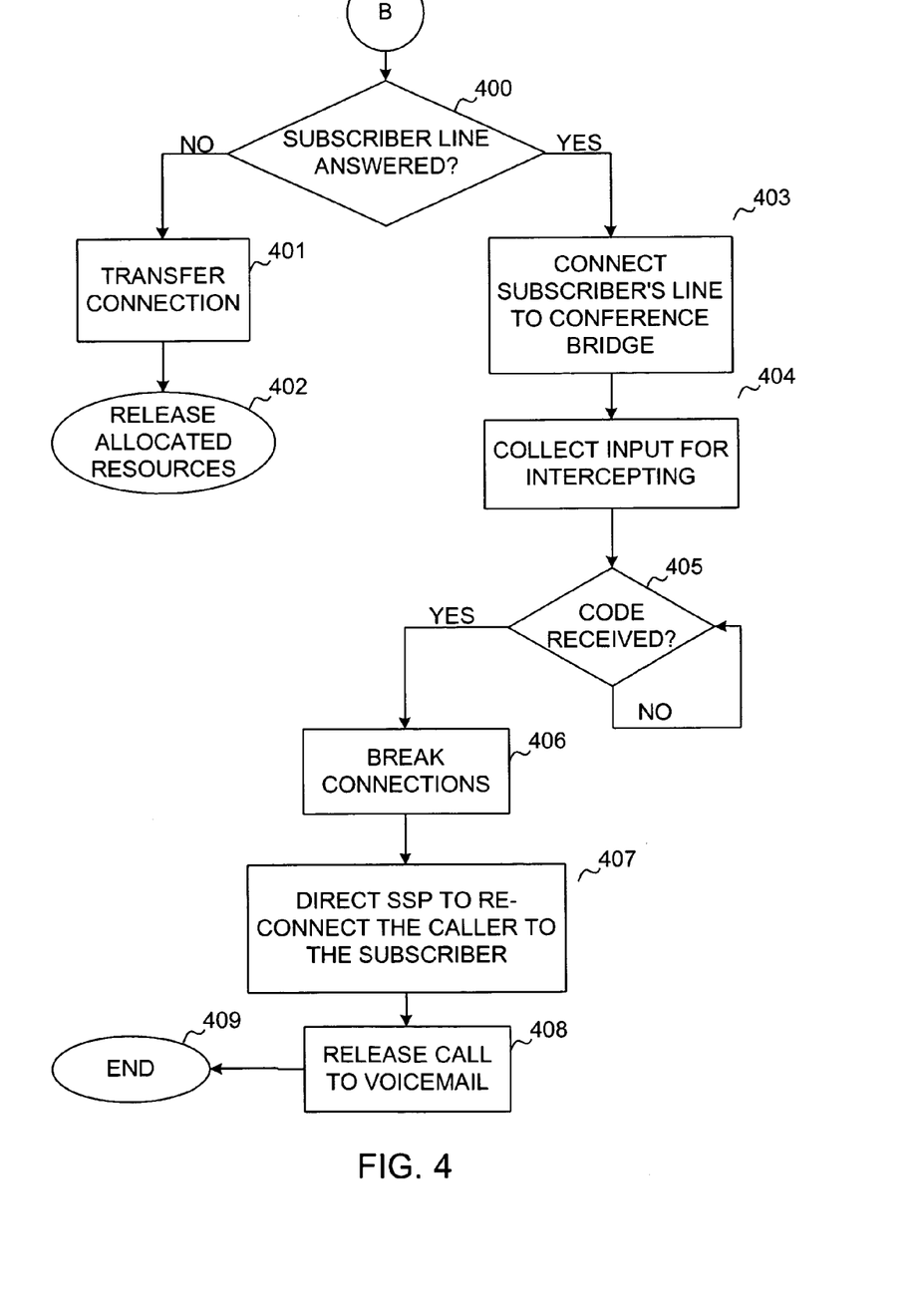
FIG. 4 is a flow diagram according to an embodiment of the present invention, illustrating steps performed by a service node to enable the subscriber to screen the voicemail message and optionally, intercept the call.

FIG. 4 illustrates the final steps performed by the SN to enable the subscriber to screen the voicemail message and optionally, to intercept the call. In step 400, the SN detects whether or not the call to subscriber's line has been answered. If the call remains unanswered after a certain number of rings, a timeout condition occurs, and the SN transfers the connection to its SSP in step 401, and releases all allocated conference resources in step 402. As described above, step 401 may be carried out on the SN by instructing the SSP to join the caller's call to the VMS call thereby removing the SN from the call path. In step 401, the timeout condition is preferably set such that if CFDA is used on the SSP, then the SN waiting time is just shorter than the time required for CFDA to take effect. This will ensure that the call from the SN to the subscriber's line is not forwarded back to the SN. However, the SN is preferably be programmed so that even if the call is inadvertently forwarded back to the SN, the call should be ignored or answered and quickly disconnected.

If the subscriber answers the call from the SN (for example, if distinctive ringing is used, when the subscriber may recognize the call is related to the voicemail screening service), then the SN connects the subscriber's line to the conference bridge, in step 403. As described above, the subscriber's connection to the conference bridge is set up to prevent the caller from hearing the subscriber on the conference call. In step 404, the SN monitors the call leg to the subscriber's line to collect any input from the subscriber indicating the subscriber wants to intercept the call. If such an instruction (or code) is received, in step 405, then the SN enables the subscriber to speak to the caller. To accomplish this, the SN breaks the conference connection in step 406, directs its SSP to re-connect the caller directly to the subscriber line in step 407, and releases the call to the VMS in step 408. Accordingly, the SN drops out of the call processing and the voicemail screening process ends in step 409.

Figure 5:
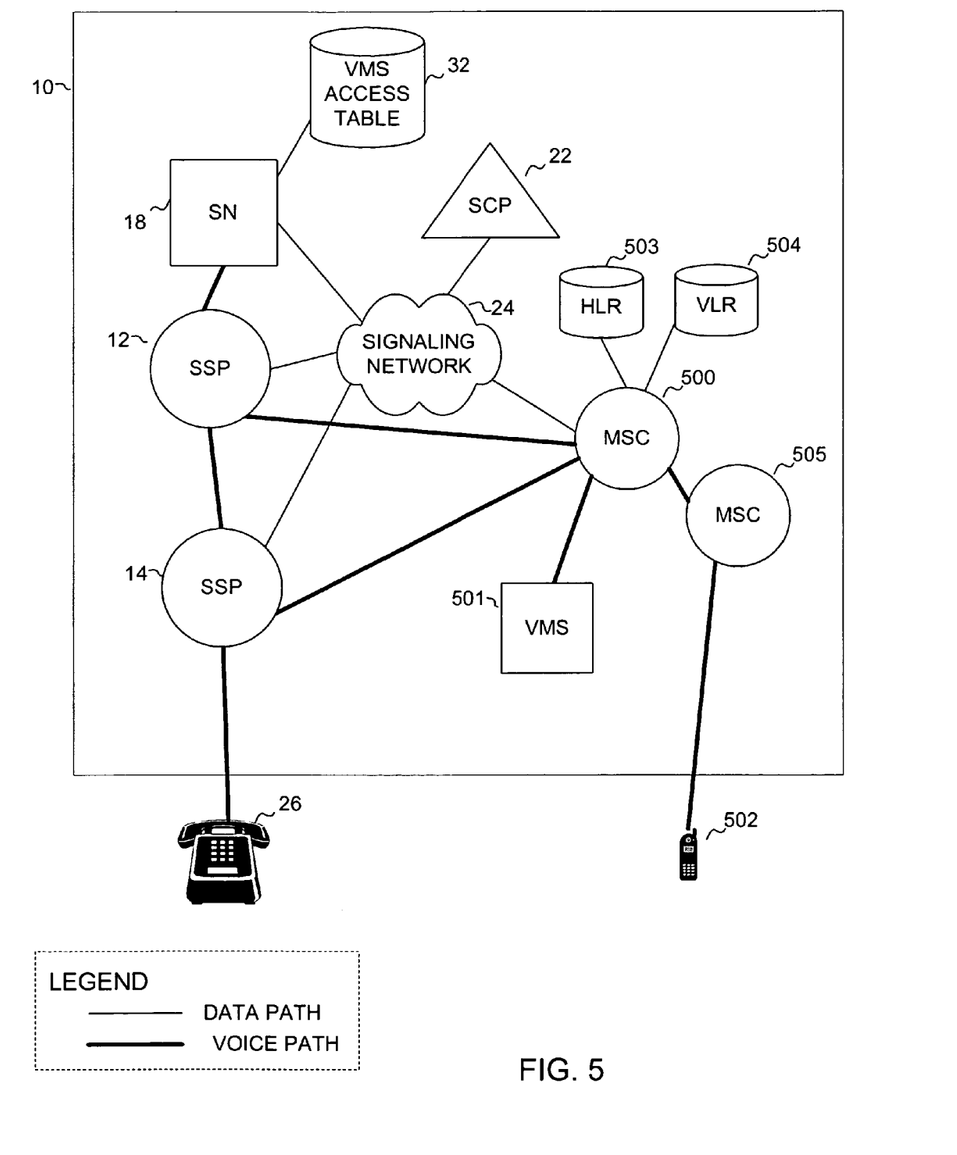
FIG. 5 is a schematic diagram of the architecture for a voicemail service according to an embodiment of the present invention, in which calls to a wireless telephone are redirected to voicemail.

FIG. 5 is a schematic diagram of the architecture for voicemail call screening service directed to calls to a wireless telephone. Although the call is routed through the wireless network to send the call to a wireless telephone, the operation of the service node to create a three port conference bridge and to enable the subscriber to intercept a call to the voicemail service operates in a similar fashion as described above. The wireless telephone service provider may implement a CFDA feature on mobile switching center (MSC) 500 to forward any unanswered calls to wireless telephone 502 to service node 18. Although VMS 501 is shown as being connected directly to MSC 500 in FIG. 5, the VMS system may be connected to some other MSC or to a SSP as known in the art.

As known in the art, the implementation of this embodiment may require special consideration due to the inherent differences between a purely landline based network and a wireless network. For example, call setup times for calls to wireless telephones are typically around four seconds longer than for calls to landline telephones. This means that the subscriber may miss the first few seconds of the caller's message being recorded by VMS 501. The voicemail screening service may be implemented to overcome this problem by delaying the connection between the caller and the VMS system to allow adequate time to set up the second call (from the SN) to the subscriber's wireless telephone 502. From a practicality standpoint, however, such delays may be unacceptable to the caller and may result in the caller hanging up before being connected to the VMS system.

Operationally, when a caller (using telephone 26) places a call to wireless telephone 502 by dialing the DN assigned to telephone 502, the call is routed to MSC 500. Note, that although the caller in this example uses a landline telephone, serviced by SSP 14, the caller may in fact be calling from a wireless telephone serviced by MSC 500 or some other MSC (not shown in FIG. 5). MSC 500 consults home location register (HLR) 503 and/or visiting location register (VLR) 504 to determine whether or not wireless telephone 502 is available and how to route the call. For example, if wireless telephone 502 is currently being serviced by MSC 505, VLR 504 provides the routing information needed to complete the call set up to MSC 505. If the subscriber's wireless telephone 502 is unavailable (e.g., if wireless telephone is not powered on or is out of the wireless service area) MSC 500 forwards the call to SN 18. Similarly, if wireless telephone 502 receives the call, but the call is not answered after a predetermined amount of time (or after a number of rings) MSC 505 forwards the call to SN 18. This call forwarding process on MSC 500 or MSC 505 may be carried out using a CFDA feature forwarding the call to a DN for SN 18, as described above. Alternatively, a wireless intelligent network (WIN) trigger may be used to retrieve call routing instructions from SCP 22 as described above. If the call to wireless telephone 502 is answered, then no additional action is required by the voicemail call screening service.

SN 18 receives the forwarded call and connects the caller to the wireless subscriber's voicemail box on VMS 501 in the same manner as described with reference to FIG. 1. Once the call is connected to the voicemail service, the caller may be provided an announcement from VMS 501, after which the caller may leave a message in the normal course.

As the call is being placed from SN 18 to the subscriber's VMS 501, a second outgoing call is also placed from SN 18 to the subscriber's wireless telephone 502. As described above, the call from SN 18 to wireless telephone 502 may be placed first to allow sufficient call set up time. As with any call to wireless telephone 502, the call from SN 18 is routed to MSC 500 as described above. Because the subscriber may now be located in a different cell site, MSC 500 must still consult one or both of HLR 503 and VLR 504 complete the call routing wireless telephone 502. Once the wireless telephone is located, this call can optionally be made to a dependent RingMaster™ number that is affiliated with wireless telephone 502, to generate a "distinctive ringing" on the caller's wireless telephone (if configured for that service).

As described with reference to FIG. 1, SN 18 allocates a 3-port conference bridge for conferencing the caller's call (which has been forwarded to SN 18) with both the subscriber's wireless telephone 502 and the call from SN 18 to VMS 501. After VMS 501 answers the call from SN 18, SN 18 answers the call from telephone 26 and connects the two calls via the conferencing bridge.

If the call from SN 18 to wireless telephone 502 is unanswered (or cannot be completed, e.g., if the subscriber is out of the wireless service area), SN 18 drops out of the call path as described above. That is, SN 18 breaks the bridge connection and instructs SSP 12 to connect the call path between telephone 26 and VMS 501. Moreover, SN 18 releases all allocated resources. If the subscriber's wireless telephone 502 is answered, the SN will connect that call to the conference bridge. Again, as described with reference to FIG. 1, the call path through the conference bridge from the subscriber is set up so that the subscriber may hear the caller but the caller cannot hear the subscriber.

While the connections of the three parties are established, the subscriber is able to screen the message being left by the caller. In the meantime, the SN monitors the connection to the subscriber to determine whether the subscriber wishes to intercept the call to voicemail. As described above, the subscriber may enter a predetermined key sequence or may issue oral commands to so instruct the SN. If such a command is received, SN 18 allows the subscriber to speak to the caller in the same manner as described with reference to FIG. 1. IN this case, SN 18 preferably breaks the connections of three party conference and instructs SSP 12 to re-connect the caller to the subscriber to complete the voicemail call screening service. Finally, SN 18 preferably instructs VMS 501 to stop recording and to delete the partially recorded voicemail message before ending the call to VMS 501.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for enabling a voicemail subscriber to screen telephone calls, the method comprising:
   detecting that an incoming call intended for a subscriber's telephone is unanswered;
   forwarding the incoming call to a service node upon detecting that the incoming call is unanswered;
   searching a voicemail access table to determine a voicemail access number associated with the subscriber's telephone line;
   placing a first outgoing call from the service node to the subscriber's telephone;
   when the subscriber's telephone operates in a wireless network, delaying placing a second outgoing call from the service node to the subscriber's voicemail box to account for a longer call set-up time in the wireless network, the delayed second outgoing call ensuring the subscriber may screen an entire message recorded by a voicemail system;
   connecting the incoming call, the first outgoing call, and the second outgoing call to a three-way conference bridge,
   wherein the first outgoing call to the subscriber's telephone is connected via a connect_oneway_path to the subscriber's telephone without any further subscriber intervention upon detecting that the first outgoing call to the subscriber's telephone is answered, such that the subscriber can monitor a voicemail message as it is being recorded into the subscriber's voicemail box.

2. The method of claim 1, wherein the subscriber's telephone line is connected to the conference bridge such that a voice path joining the subscriber's telephone line and the incoming call does not permit the incoming call to receive input from the subscriber's telephone line.

3. The method of claim 1, wherein the subscriber's telephone is a landline telephone operating in a landline network.

4. The method of claim 1, wherein the second outgoing call from the service node to the subscriber's voicemail box is delayed about four (4) seconds.

5. The method of claim 1, wherein the service node answers the incoming call after the second outgoing call to the subscriber's voicemail box has been answered.

6. The method of claim 1, wherein the first outgoing call to the subscriber's telephone line is placed using a dependent number, wherein a distinctive ringing pattern is provided to the subscriber's telephone line.

7. The method of claim 1, further comprising:
   receiving an instruction over the subscriber's telephone to indicate that the subscriber desires to intercept the incoming call; and
   reconnecting the subscriber to the incoming call for a two-way conversation in response to the instruction.

8. The method of claim 1, further comprising:
   receiving a key sequence provided over the subscriber's telephone to indicate that the subscriber desires to intercept the incoming call; and
   reconnecting the subscriber to the incoming call for a two-way conversation in response to the key sequence.

9. The method of claim 8, further comprising releasing the second outgoing call from the service node to the subscriber voicemail box, wherein the conference bridge connection is broken upon detecting the key sequence from the subscriber's telephone.

10. The method of claim 1, further comprising the step of communicating at least one of a calling name and a calling number for the service node to inform the subscriber that the second outgoing call is from a voicemail monitoring service.

11. A system for enabling subscribers to a voicemail service to screen telephone calls forwarded to a voicemail box, the system comprising:
   a service switching point for routing the telephone calls to and from a subscriber's telephone, wherein the service switching point comprises an AIN trigger;
   a service control point for directing the routing of the telephone calls received at a service switching point in response to a query generated by the AIN trigger;
   a service node for receiving an incoming telephone call routed from the service switching point; and
   an access table, wherein the service node retrieves a voicemail access number associated with the subscriber's telephone line from the access table,
   wherein when the subscriber's telephone operates in a wireless network, and when the service node receives the incoming telephone call, the service node places a first outgoing call to the subscriber's telephone and delays placing a second outgoing call to a voicemail box to account for a longer call set-up time in the wireless network, the delayed second outgoing call ensuring the subscriber may screen an entire message recorded by a voicemail system, and the service node allocates a three-way conference bridge between the incoming call and the second outgoing call to the voicemail box when the second outgoing call to the voicemail box is answered, and connects the first outgoing call to the subscriber's telephone via a connect_oneway_path without any further subscriber intervention when once the call to the subscriber's telephone is answered.

12. The system according to claim 11, wherein the service node answers the incoming call after the second outgoing call to the voicemail box is answered, and wherein the second outgoing call from the service node to the subscriber's voicemail box is delayed about four (4) seconds.

13. A method for enabling a voicemail subscriber to screen telephone calls, the method comprising:
   placing an outgoing call to a subscriber's telephone via a telephone number for generating a first ringing pattern;
   detecting that an incoming call intended for a subscriber's telephone is unanswered;
   forwarding the incoming call to a service node upon detecting that the incoming call is unanswered;
   searching a voicemail access table to determine a voicemail access number associated with the subscriber's telephone line upon receiving the incoming call;
   when the subscriber's telephone operates in a wireless network, delaying placing a first outgoing call from the service node to the subscriber's voicemail box to account for a longer call set-up time in the wireless network, the delayed second outgoing call ensuring the subscriber may screen an entire message recorded by a voicemail system;
   placing a second outgoing call from the service node to the subscriber's telephone via a dependent telephone number for generating a distinctive ringing pattern that is different from the first ringing pattern;
   connecting the incoming call and the outgoing calls to a three-way conference bridge nearly simultaneously, wherein the call to the subscriber's telephone is connected via a connect_oneway_path; and in response to receiving an instruction over the subscriber's telephone indicating that the subscriber desires to intercept the incoming call, reconnecting the subscriber to the incoming call for a two-way conversation.

14. The method of claim 13, wherein the instruction is a key sequence, and wherein the second outgoing call from the service node to the subscriber's voicemail box is delayed about four (4) seconds.

15. The method of claim 13, wherein the instruction is a word or phrase spoken into a receiver of the subscriber's telephone and recognized via speech processing.

16. The method of claim 13, further comprising the step of communicating at least one of a calling name and a calling number for the service node to inform the subscriber that the second outgoing call is from a voicemail monitoring service.

17. A computer-readable medium storing instructions for performing the steps of:

detecting that an incoming call intended for a subscriber's telephone is unanswered;

forwarding the incoming call to a service node upon detecting that the call is unanswered;

searching a voicemail access table to determine a voicemail access number associated with the subscriber's telephone line;

placing a first outgoing call from the service node to the subscriber's telephone;

when the subscriber's telephone operates in a wireless network, delaying placing a second outgoing call from the service node to the subscriber's voicemail box to account for a longer call set-up time in the wireless network, the delayed second outgoing call ensuring the subscriber may screen an entire message recorded by a voicemail system;

connecting the incoming call, the first outgoing call, and the second outgoing call to a three-way conference bridge, wherein the first outgoing call to the subscriber's telephone is connected via a connect_oneway_path to the subscriber's telephone without any further subscriber intervention upon detecting that the first outgoing call to the subscriber's telephone is answered, such that the subscriber can monitor a voicemail message as it is being recorded into the subscriber's voicemail box.

* * * * *